Nov. 6, 1928.
E. G. PETERS
BATTERY TESTER
Filed Sept. 12, 1927
1,690,500
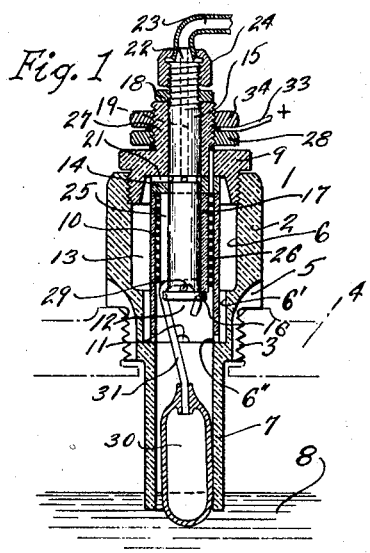
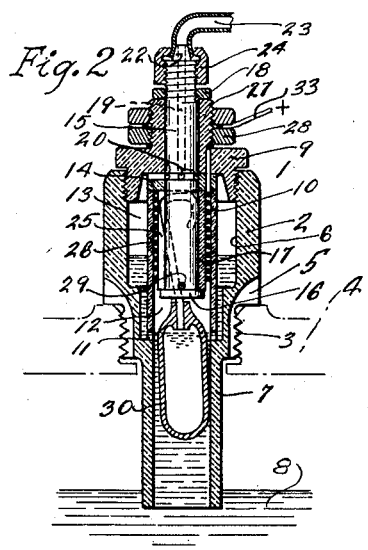
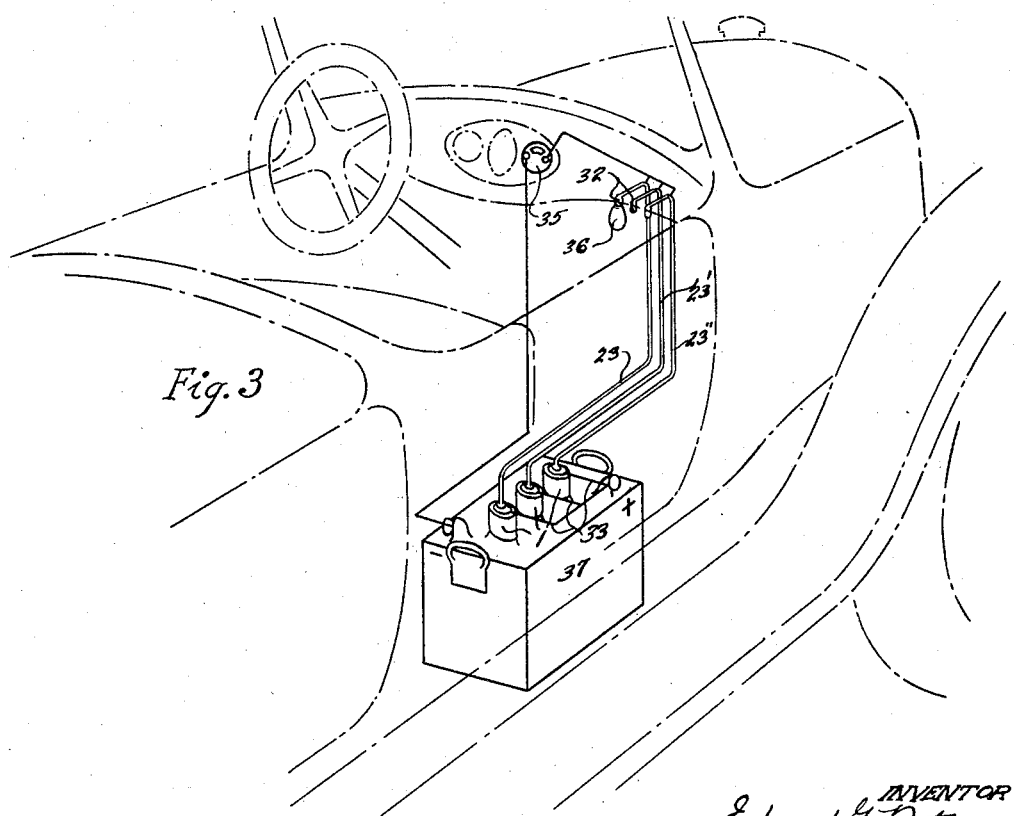
INVENTOR
Edgar G. Peters
By Frank R. Higley
ATTORNEY Patented Nov. 6, 1928.

1,690,500

UNITED STATES PATENT OFFICE.

EDGAR G. PETERS, OF CLEVELAND, OHIO.

BATTERY TESTER.

Application filed September 12, 1927. Serial No. 218,989.

This invention relates to battery testers and more particularly to that class of hydrometric devices for ascertaining the condition of a storage battery by taking advantage of the fact that specific gravity of the electrolyte in the cells thereof varies with the condition of the battery as to the charge therein.

It is an object of this invention to provide such a device which may easily be applied to any cell of any battery of standard dimensions and by which thereafter the condition of such cell may be instantly determined at a point removed therefrom.

My invention is particularly adapted for employment in connection with the storage battery and electric system of an automobile, wherein the battery is usually placed in a relatively inaccessible location but an ammeter in connection therewith is mounted on the dash. It is therefore a further object of my invention to provide means for ascertaining the condition of the individual battery cells by indications of the ammeter without the necessity of actual access to the battery.

A further object of the invention is to provide such a device which may be manufactured at a minimum of expense, which with the additional parts necessary for its operation may be applied in the simplest manner possible and which will function thereafter accurately and surely.

Further objects and advantages, together with the exact nature of my invention, will appear from the following description taken in connection with the accompanying drawings, in which Figs. 1 and 2 are sectional views of the plug employed showing the parts thereof in inoperative and operative relations respectively; Fig. 3 is a perspective view showing an automobile installation in which the parts of my complete battery testing system appear in full lines and other parts of the automobile in which the system is incorporated appear in dot and dash lines.

Referring to the drawings, the principal part or unit of my device is a plug 1, the base member 2 of which is of non-corrosive material, such as hard rubber, having the threads 3 adapted for insertion in the usual threaded opening provided at the top of the closure member 4 of a storage battery cell.

Vent openings 5 are formed by slotting the base member 2 to take the place of the opening in the usual cap which my plug replaces. The base member is generally tubular or open through its center, and is centrally moulded or step-bored out to form a graduated series of communicating bores 6, 6′, 6″, as indicated, and its lower portion containing the bore 6″ is extended to form a well 7 of length to terminate somewhat below the normal level of electrolyte 8 in the cell. In the mouth of the bore 6 is secured a nut or cap 9 of non-conductive material as by the threaded connection indicated. Between the member 9 and the shoulder formed by the bores 6′ and 6″ is a tubular member 10 of non-conductive material having at its lower extremity a number of notches 11 and dividing the space within the bore 6 into a chamber 12 communicating with the bore 6″ of the well 7 and an annular chamber 13 thereabout; the chamber 13 being in communication with the cavity 12 and the well by passages through the notches 11. Conveniently a washer 14 of non-conductive material is positioned between the cap 9 and the member 10. The cap 9 has a central opening to receive a stem 15, the lower extremity of which has a shoulder or head 16 between which and the washer 14 is positioned an insulator 17, the upper extremity of the stem being threaded so that the stem and therefore the insulator as well, may be firmly secured by the nut 18.

The upper portion of the stem is drilled to form a longitudinal passage 19 communicating with radial passages 20 and an annular groove indicated in the plane of the washer 14 which is slotted on its upper face as at 21 whereby communication with the chamber 13 may be had through stem 15. A taper 22 is provided on the upper extremity of the stem to receive the flared end of a metallic tube 23 secured thereagainst by a fitting 24.

The insulator 17 is generally tubular but is longitudinally slotted as at 25, and has tightly wound upon it a coil 26 of resistance wire. The lower end of the coil has no direct connection with the stem 15 but is secured in any convenient manner with the insulator, the upper end of the coil passing through suitable aligned openings in the washer 14 and the cap 9 as indicated. The upper extremity of the cap 9 is provided with a threaded nipple portion 27, about which the end of the resistance wire is turned and secured by a nut 28.

The lower portion of the stem 15 is diametrically slotted in alignment with the slot 25 of the insulator 17 and a pin 29 is arranged transversely of the slot adjacent the lower extremity of the stem. Within the well portion 7 is a float 30 of non-corrosive material such as glass or rubber, carrying at its upper end a contactor 31. The contactor may be of spring material and have its upper portion bent as indicated to form a resilient hook or open eye lying in the slot of the stem, extending into the slot 25 of the insulator 17 and retained in the stem slot by the pin 29. The balance of the contactor is such that the same will tend, when the same is supported by the float, to tilt to engagement with the resistance coil; but to insure such engagement the eye may be made of such dimension as to bear against the opposite wall of the member 17.

By the arrangement described, when a suction is applied through the tube 23 a vacuum will be created in the chamber 13, the electrolyte will rise in the well to the elevation of the notches 11 and may overflow therethrough into the chamber 13 as indicated in Fig. 2, but will not enter the cavity 12. The sectional area of the chamber 13 in a horizontal plane is so very much larger than that of the well and cavity less that of the float, that even though the electrolyte may rise in the chamber to an elevation as indicated in Fig. 2, the liquid level in the cavity will be substantially exactly fixed by the elevation of the notches 11. As the electrolyte rises in the well to such predetermined level in the cavity, the float will also rise, carrying with it the contactor which will make connection between the stem 15 and adjacent turns of the resistance coil, engagement between the contactor and the coil being insured by the tendency of the contactor to tilt in the slot, or by the resilience of the eye portion of the contactor. Since the electrolyte level under such conditions is invariable with respect to the cavity 12 and resistance coil 26, the turn of the coil with which the contactor will engage will be determined by the position of the float which in turn will be determined by the specific gravity of the electrolyte.

Turning now to Fig. 3, each of the three cells of the usual six-volt automobile battery 37 is provided with a plug as described. Metallic tubes 23, 23′ and 23″ are led from the several plugs to corresponding nipples 32 on the dash. Wires 33 are connected with the nipple portions of the plugs as by binding post nuts 34 and bussed together with connection to the positive terminal of the battery. The negative terminal of the battery is connected to the ammeter 35 on the dash which in turn has connection with the tubes 23.

Under ordinary conditions such an arrangement will not affect the ammeter 35 which will operate in its normal manner according to the other circuits in which it is connected. In the arrangement described, however, by placing a bulb 36 over one of the nipples 32 and properly manipulating the same, electrolyte will be induced into the plug of the corresponding battery cell, whereupon the ammeter will immediately indicate the condition of the plates in that cell; the higher the specific gravity of the electrolyte thereof the higher will the contactor 31 of the plug therein be carried by its float, the less number of turns of the resistance coil 17 being included in the circuit and the higher will be the reading of the ammeter.

Preferably the capacity of the bulb is just sufficient to cause electrolyte to rise slightly into the chamber 13, so that when the bulb is placed over a nipple 32, collapsing the bulb will force air down through the tube 23 and out of the mouth of the well 7 of the corresponding plug 1, whereupon release of the bulb will allow it to expand and cause a rise into the plug of the proper volume of electrolyte.

While a calibration might be provided on the ammeter face reading directly in specific gravity of the electrolyte, this is not necessary as the ordinary calibration may be utilized to estimate with sufficient accuracy the result of the test reading.

Where the electrolyte of the cell to be tested has fallen below the level of the well mouth of the plug therein, either through evaporation or leakage, no reading of the ammeter will indicate the dangerous condition in the cell.

The remaining cells may, of course, be similarly tested successively.

It will be seen from the above that in substance my invention comprises a separate hydrometer located immediately in connection with each battery cell, the hydrometers being provided, however, with variable resistances in place of the usual direct reading scales; and means located as upon the dash of the automobile in which the battery is mounted, for selectively controlling the functioning of the hydrometer and for obtaining readings from the same.

What I claim is:

1. A device of the class described, comprising a plug adapted for application to a battery cell and having a cavity and a portion adapted to extend therebelow into the electrolyte of said cell, said portion having a well opening into said electrolyte and communicating with said cavity, means for inducing an electrolyte rise in said well to a predetermined elevation, a float in said well, a contactor carried by said float, a resistance arranged in said cavity for engagement by said contactor when said float is elevated by said electrolyte rise, and electrical connections arranged to include in a circuit portions of said resistance dependent upon the elevation of the contactor.

2. In a device of the class described, a plug adapted for application to a battery cell and having a cavity and a chamber and a portion adapted to extend therebelow into the electrolyte of said cell, said portion having a well communicating with said cavity and with said chamber, said cavity being closed except for said well communication, means for inducing an electrolyte rise in said well, means for causing overflow of said electrolyte into said chamber whereby the electrolyte will not exceed a predetermined level with reference to said cavity, a float in said well, a contactor carried by said float, a resistance arranged in said cavity for engagement by said contactor when said float is elevated by said electrolyte rise, and electrical connections arranged to include in a circuit portions of said resistance dependent upon the elevation of the contactor.

3. In a device of the class described, a plug adapted for application to a battery cell and having a cavity and a chamber and a portion adapted to extend therebelow into the electrolyte of said cell, said portion having a well communicating with said cavity and with said chamber, said cavity being closed except for said well communication, means for inducing an electrolyte rise in said well, means for causing overflow of said electrolyte into said chamber whereby the electrolyte will not exceed a predetermined level with reference to said cavity, a float in said well, a contactor carried by said float, a resistance arranged in said cavity for engagement by said contactor when said float is elevated by said electrolyte rise, and electrical connections arranged to include in a circuit portions of said resistance dependent upon the elevation of the contactor, the sectional area of said chamber being substantially greater than that of said cavity less that of said float.

4. A device of the class described comprising a base adapted for application to a battery cell and having communicating bores, one of said bores forming a well in a portion adapted to extend into the electrolyte of said cell, a cap closing the opposite end of said base, a tubular member secured between the shoulder formed by one of said bores and said cap, to form within said base a cavity communicating with said well and an annular chamber about said cavity, said tubular member having an opening forming a passage between said chamber and said cavity adjacent said shoulder, a stem extending through said cap, an insulator on said stem, resistance means on said insulator, said stem having a passageway leading from said chamber outwardly, a float in said well, a contactor carried by said float and adapted to make connection between said stem and said resistance means dependent upon elevation of said float, said stem being adapted to position said contactor, means for applying a suction through said passage to cause said electrolyte to rise in said well to the elevation of said opening and overflow into said chamber, whereby said float will elevate said contactor to engage said resistance means dependent upon the specific gravity of said electrolyte, and means completing a circuit between said stem and an end of said resistance and including a measuring instrument whereby the current flow in the circuit may be ascertained.

5. In an automobile having an ammeter arranged in view of the seat of the operator thereof and a storage battery at a relatively inaccessible location, a hydrometer in a cell of said storage battery, means accessible to the operator occupant of said seat for controlling the operation of said hydrometer and electrical connections for causing a reading of the same to appear at said ammeter.

Signed by me, this 22d day of August, 1927.

EDGAR G. PETERS.